US009269516B2

(12) United States Patent  
Solis

(10) Patent No.: US 9,269,516 B2  
(45) Date of Patent: Feb. 23, 2016

(54) QUAKE PLUG

(71) Applicant: Steve Javier Solis, Montclair, CA (US)

(72) Inventor: Steve Javier Solis, Montclair, CA (US)

(73) Assignee: Steve Javir Solis, Montclair, CA (US)

( * ) Notice: Subject to any disclaimer, the term of this patent is extended or adjusted under 35 U.S.C. 154(b) by 81 days.

(21) Appl. No.: 14/316,924

(22) Filed: Jun. 27, 2014

(65) Prior Publication Data
US 2015/0380190 A1 Dec. 31, 2015

(51) Int. Cl.
H01H 35/14 (2006.01)
H01H 35/00 (2006.01)
F16K 17/36 (2006.01)

(52) U.S. Cl.
CPC ............. H01H 35/144 (2013.01); F16K 17/36 (2013.01); H01H 35/006 (2013.01); H01H 35/141 (2013.01); Y10T 137/0753 (2015.04)

(58) Field of Classification Search
CPC . H01H 35/144; H01H 35/006; H01H 35/141; G01F 25/0007; G01F 1/8436; G01F 1/6965; F16K 17/36; Y10T 137/0753
See application file for complete search history.

(56) References Cited

U.S. PATENT DOCUMENTS

| | | | | | |
|---|---|---|---|---|---|
| 3,768,497 | A | * | 10/1973 | Mueller | F16K 17/363 137/38 |
| 4,091,831 | A | * | 5/1978 | Pazmany | F16K 17/366 137/38 |
| 4,191,868 | A | * | 3/1980 | Sunde | F16K 17/36 200/61.5 |
| 4,382,449 | A | * | 5/1983 | Nelson | F16K 17/36 137/38 |
| 4,535,796 | A | * | 8/1985 | Terrones | F16K 17/36 137/45 |
| 4,844,113 | A | * | 7/1989 | Jones | F16K 17/363 137/39 |
| 4,960,147 | A | * | 10/1990 | Diamond | F16K 17/36 137/45 |
| 5,240,025 | A | * | 8/1993 | Morris | F16K 17/366 137/38 |
| 5,449,015 | A | * | 9/1995 | Petkovic | F16K 17/36 137/38 |
| 5,777,285 | A | * | 7/1998 | Frank | H01H 35/143 200/61.45 R |
| 5,975,105 | A | * | 11/1999 | Chang | F16K 17/36 137/38 |
| 6,109,287 | A | * | 8/2000 | Cole | F16K 17/366 137/38 |
| 6,112,764 | A | * | 9/2000 | Engdahl | F16K 17/36 137/38 |
| 7,152,615 | B1 | * | 12/2006 | Engdahl | H01H 35/14 137/1 |
| 7,650,901 | B2 | * | 1/2010 | Engdahl | F16K 17/366 137/38 |
| 2008/0060701 | A1 | * | 3/2008 | Kim | F16K 17/363 137/38 |

OTHER PUBLICATIONS

USPTO Office of Innovation Development, Claim Drafting for Beginners, Aug. 15-16, 2014.*

* cited by examiner

Primary Examiner — Michael Zarroli

(57) ABSTRACT

An original apparatus that will react and shut off a main fluid source during a severe earthquake. A steel ball is held at an elevated position by a secured magnet. In a severe earthquake, the seismic vibrations will cause the steel ball to break away from the magnet and fall onto the slide trigger. The weight of the steel ball and slide trigger will be pushed down and the slide trigger shall engage a momentary switch that will send voltage to a normally open motorized ball valve and cause it to close. The apparatus can be reset by manually pulling upward the lift handle towards the top cap. Resulting in the momentary switch to disengage and the voltage will seize to power the normally open motorized ball valve, causing it to go back to its normally open state. Thus allowing the fluid to pass through the ball valve.

10 Claims, 4 Drawing Sheets

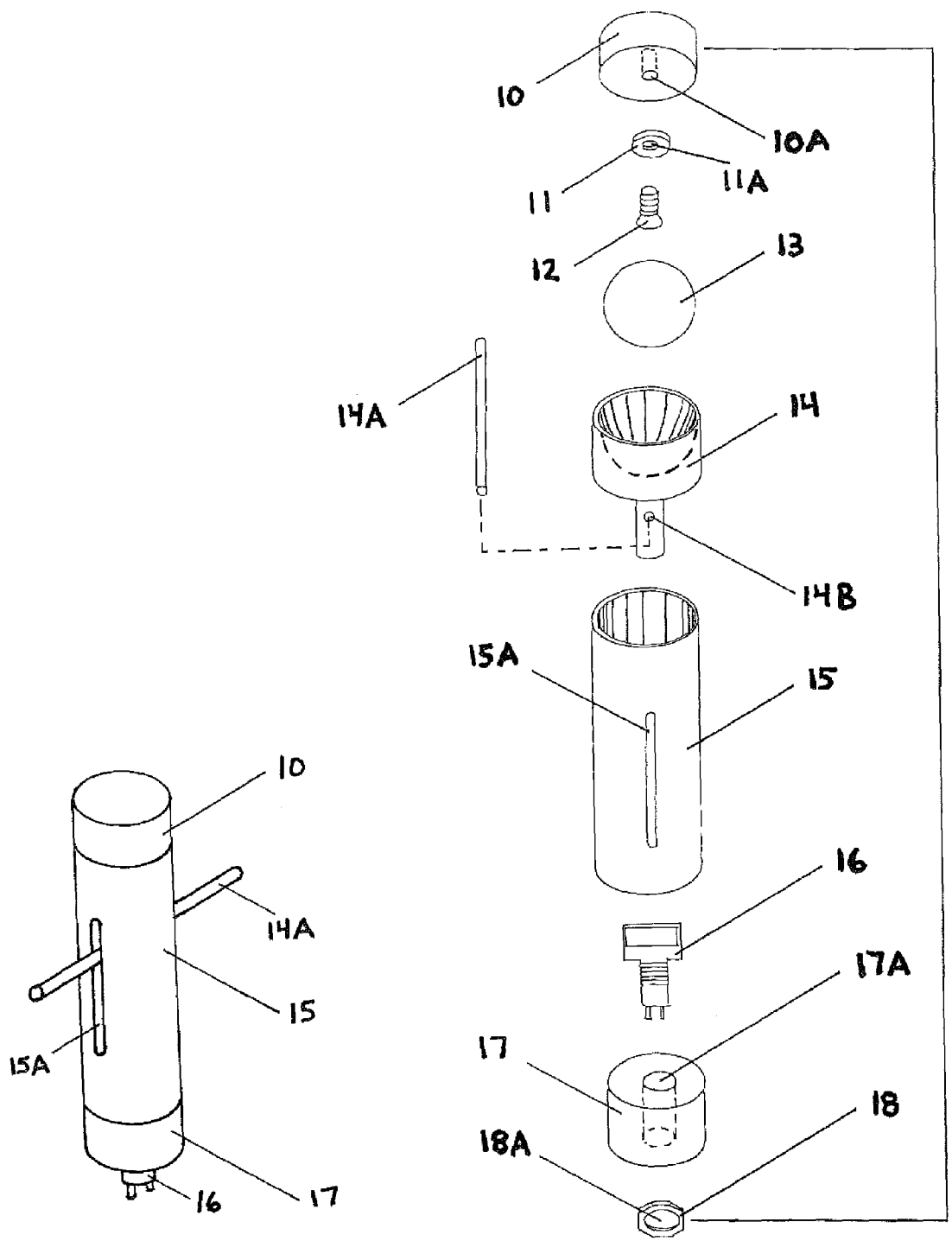

QUAKE PLUG

BACKGROUND OF THE INVENTION

1. Field of the Invention

This invention relates to improvements in a quake plug to react and shut off a main fluid source during a severe earthquake.

2. Description of the Related Art Including Information Disclosed Under 37 CFR 1.97 and 37 CFR 1.98

Not applicable

BRIEF SUMMARY OF THE INVENTION

It is and object of the quake plug to react and shut off a main fluid source during a severe earthquake. A steel ball is held at an elevated position by a secured magnet within the housing. It is a preferred embodiment that all materials, for the exception of the steel ball are made of a non-magnetic substance, so that no internal parts interfere with the operation of the apparatus. In the event of a severe earthquake, the seismic vibrations will cause the steel ball to shake and break away from the magnet. Gravity will cause it to fall down. The steel ball will then fall onto the slide trigger. The weight of the steel ball and slide trigger will be pushed down completely and the bottom portion of the slide trigger shall make contact and engage a momentary switch. The momentary switch, in the engaged position will send direct current voltage to a normally open motorized ball valve and cause it to close. Preventing fluid to pass through said ball valve. The apparatus can be reset by manually pulling upward the lift handle towards the top cap. This will allow for the weight of the steel ball to be lifted off the momentary switch and get magnetically attached back to the magnet. Resulting in the momentary switch to disengage and the voltage will seize to power the normally open motorized ball valve, causing it to go back to its normally open state. Thus allowing the fluid to pass through the ball valve. This apparatus can be used repetitively.

DETAILED DESCRIPTION OF THE INVENTION

Figure 6:
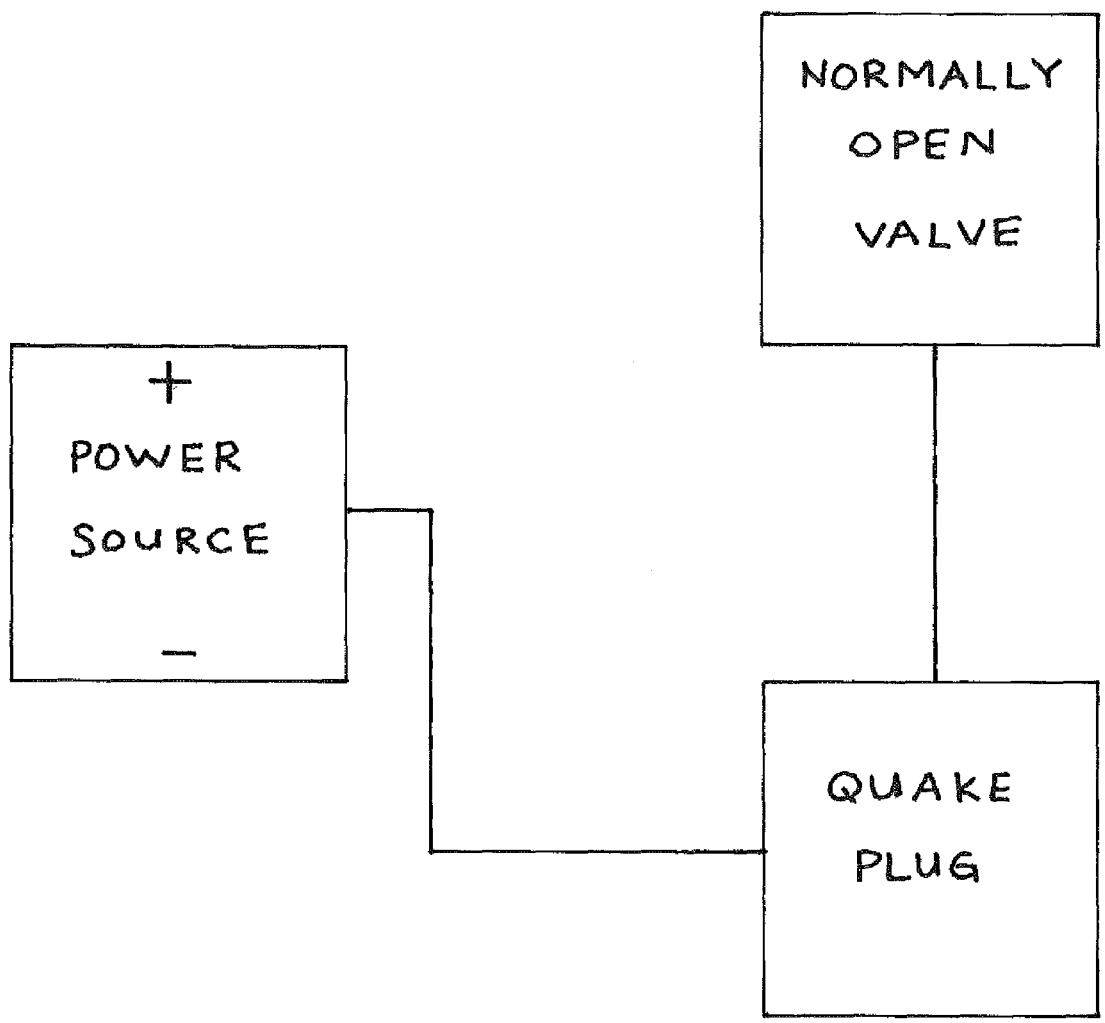

A steel ball 13 is magnetically held at an elevated position by a ring magnet 11, which is secured in place by a screw 12, which is held in place by a threaded hole 10A into the top cap 10, within the housing 15; in FIG. 2. In the event of a severe earthquake, the seismic vibrations will cause the steel ball 13 to shake and break away from the ring magnet 11. Gravity will cause the steel ball 13 to fall onto the slide trigger 14, it will be pushed down completely and the bottom portion of the slide trigger 14 shall make contact and engage a momentary switch 16; in FIG. 4. The momentary switch 16 will need to be connected to direct current. A transformer connected to an alternating current source. Or direct to batteries. Having both power sources will give redundancy to the apparatus in the event that there is a power outage during the earthquake. The momentary switch 16, in the engaged position will send voltage to a normally open motorized ball valve and cause it to close; FIG. 6. Preventing fluid to pass through said ball valve. Once the apparatus has been placed in the standby or ready state. In other words reset by manually pulling upward the lift handle 14A towards the top cap 10 in FIG. 3. The steel ball 13 will magnetically attract back to the ring magnet 11. The weight of the steel ball 13 and slide trigger 14 will be lifted off the momentary switch 16, causing the momentary switch 16 to disengage and the voltage will seize to power the normally open motorized ball valve, thus causing it to go back to its normally open state and allow the fluid to flow through. A preferred embodiment of the invention is that the parts 10, 14, 15, 17 be made of a non-magnetic substance so that those objects do not interfere with the ring magnet 11 and steel ball 13 in FIG. 2. The housing 15 must be mounted vertically such as in FIG. 1. Meaning the top cap 10 is above the housing 15. Therefore the bottom cap 17 will sit lower than the housing 15. The housing 15 should be made at an elongated distance to give chance for the steel ball 13 and slide trigger 14 to move freely in an upward and downward motion between the magnet 11 and the momentary switch 16. The slide trigger 14 should be installed loosely, so that it may move freely in an upward or downward motion, into the housing 15, followed by the lift handle 14A inserted into the slot for handle 15A and then the through hole 14B, using an adhesive compound to secure it in place with the slide trigger 14. Preventing it from coming apart and combining the two pieces as one, so that it will move as one piece in an upward or downward motion. The steel ball 13 is to be installed loosely, so that it may move freely in an upward or downward motion. The momentary switch 16 is to be installed into the center of the bottom cap 17 via a through hole 17A and be secured in place by a nut 18.

BRIEF DESCRIPTION OF THE SEVERAL VIEWS OF THE DRAWING(S)

Figure 3:
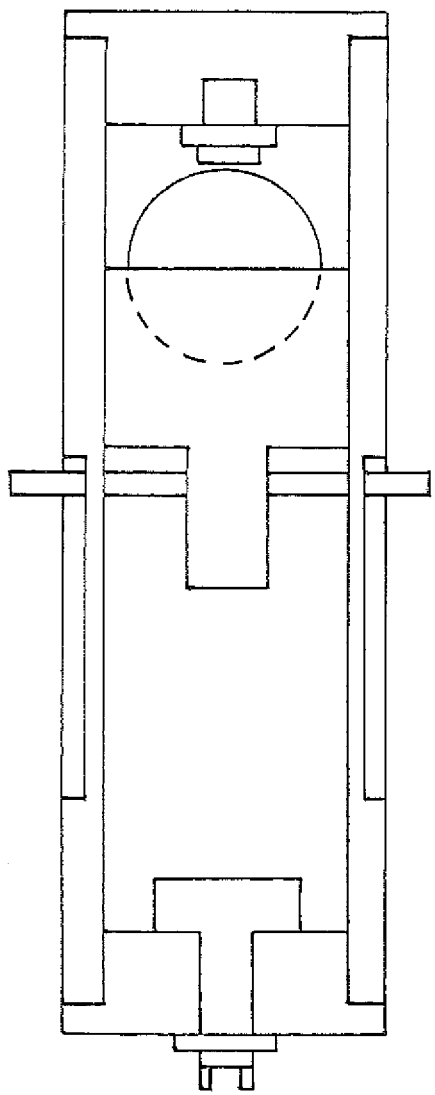
Figure 4:
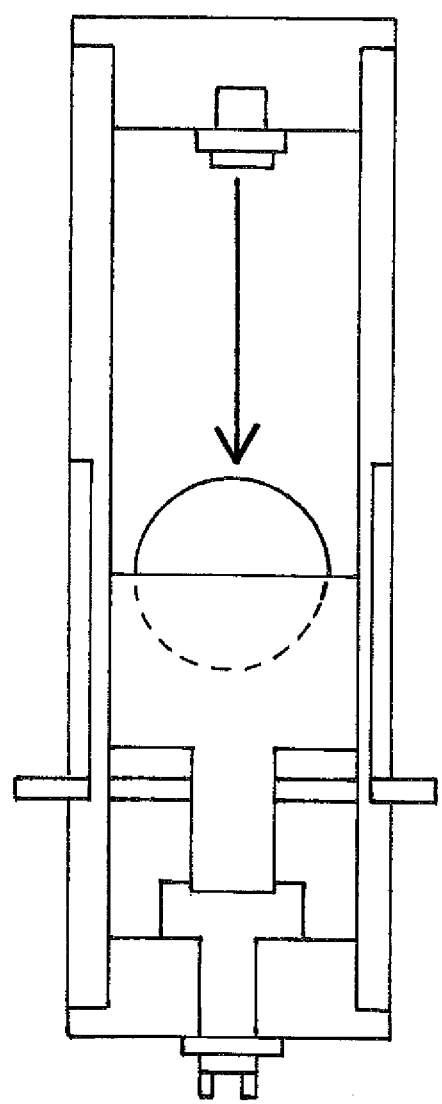
Figure 5:
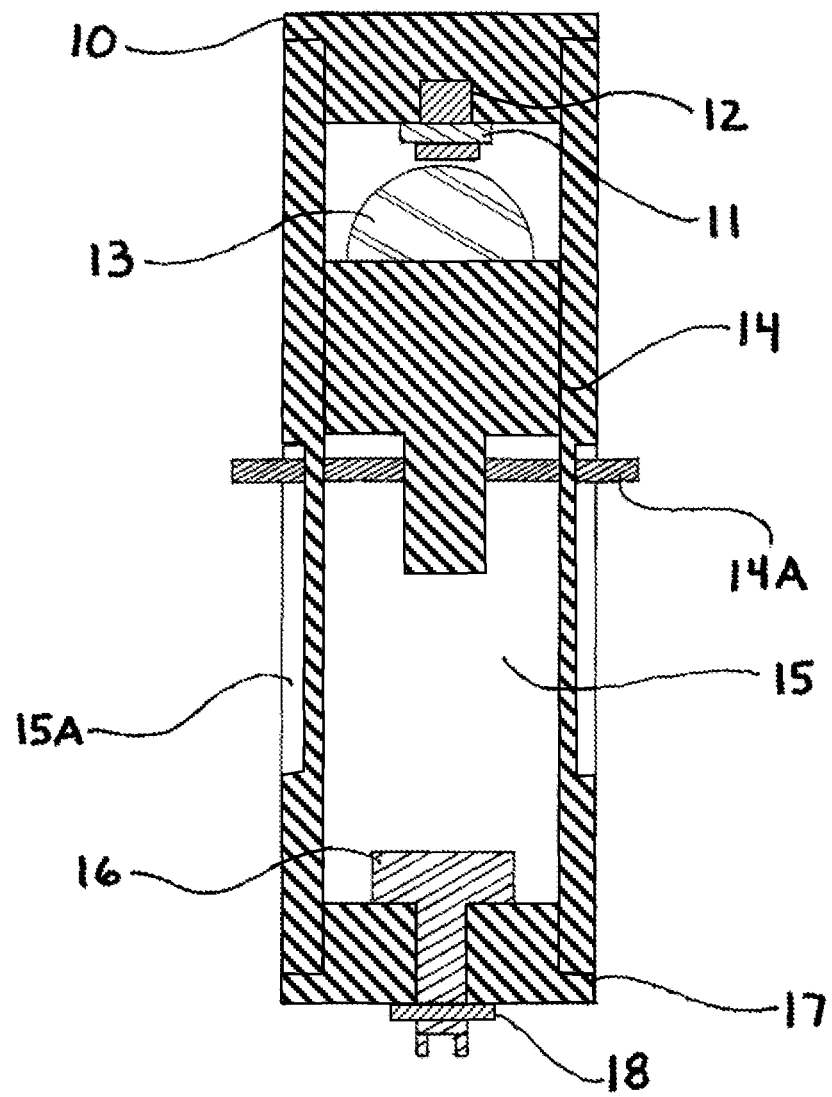

FIG. 1—Assembled front angle side view
FIG. 2—Exploded side view
FIG. 3—Front sectional view in the standby position
FIG. 4—Front sectional view in the moved position
FIG. 5—Front perspective sectional view
FIG. 6—Block diagram
10 Top Cap
10A Threaded hole for screw #12
11 Ring magnet
11A Through hole for screw #12
12 Screw
13 Steel ball
14 Slide trigger
14A Lift handle
14B Through hole for lift handle #14A
15 Housing
15A Slot for handle
16 Momentary switch
17 Bottom Cap
17A Through hole for momentary switch #16
18 Nut for momentary switch #16
18A Through hole for momentary switch #16

I claim:

1. A quake plug that reacts to seismic vibrations caused by a severe earthquake and closes a constant incoming fluid source comprising:

a housing (15) comprising a top cap (10) and a bottom cap (17);

a steel ball (13) with a round body within said housing (15);

a slide trigger (14) that has a top portion and an indentation matching the shape of said steel ball (13);

said housing (15), containing the slide trigger, where the slide trigger has a smaller diameter stem like center protruding downward, with a through hole (14b) in the stem for a lift handle (14a) to be installed, wherein the slide trigger, stem and lift handle are capable of moving freely as one, in an upward or downward motion inside of said housing (15) wherein the lift handle is accommodated in a housing slot.

2. The quake plug according to claim 1 wherein said housing (5) is mounted in a vertical orientation.

3. The quake plug according to claim 1 wherein said housing (15), said top cap (10), said slide trigger (14), and said bottom cap (17) are non-magnetic.

4. The quake plug according to claim 1 further including a magnet wherein said magnet is flat, circular in shape, with a hole in the center.

5. The quake plug according to claim 1 wherein said steel ball (13) is installed loosely in the housing (15), so that said steel ball moves freely in an upward or downward motion.

6. The quake plug according to claim 1 wherein said slide trigger (14) is installed loosely, so that said slide trigger moves freely in an upward or downward motion.

7. The quake plug according to claim 1 wherein said housing (15) is elongated and cylinder in shape that has (2) elongated opposing slots having the same width and height to allow the lift handle (14*a*) to move freely in a upward or downward motion.

8. The quake plug according to claim 1 wherein said momentary switch (16) sends direct current voltage once said momentary switch (16) is engaged and stops sending the direct current voltage once said momentary switch (16) is disengaged.

9. The quake plug according to claim 1 wherein said quake plug is manually resettable once said steel ball is in an activated position.

10. The quake plug according to claim 1 wherein said quake plug is repeatedly used and reset.

\* \* \* \* \*